(12) United States Patent
Chung et al.

(10) Patent No.: US 11,390,019 B2
(45) Date of Patent: Jul. 19, 2022

(54) ADDITIVE MANUFACTURING METHOD AND OBJECT MANUFACTURED THEREBY

(71) Applicant: Teco Image Systems Co., Ltd., Taipei (TW)

(72) Inventors: Ming-Chieh Chung, Taipei (TW); Ting-Chun Chen, Taipei (TW)

(73) Assignee: TECO IMAGE SYSTEMS CO., LTD., Taipei (TW)

(*) Notice: Subject to any disclaimer, the term of this patent is extended or adjusted under 35 U.S.C. 154(b) by 402 days.

(21) Appl. No.: 16/723,202

(22) Filed: Dec. 20, 2019

(65) Prior Publication Data
US 2021/0178693 A1    Jun. 17, 2021

(30) Foreign Application Priority Data
Dec. 13, 2019  (TW) ................................ 108145719

(51) Int. Cl.
| | |
|---|---|
| *B29C 64/153* | (2017.01) |
| *B29C 64/379* | (2017.01) |
| *B29C 64/188* | (2017.01) |
| *B29C 64/176* | (2017.01) |
| *B29C 64/241* | (2017.01) |

(Continued)

(52) U.S. Cl.
CPC .............. *B29C 64/153* (2017.08); *B22F 5/10* (2013.01); *B22F 10/00* (2021.01); *B29C 64/176* (2017.08); *B29C 64/188* (2017.08); *B29C 64/241* (2017.08); *B29C 64/379* (2017.08);

(Continued)

(58) Field of Classification Search
CPC ....... B33Y 10/00; B33Y 80/00; B29C 64/153; B22F 5/10; B22F 10/00; E05D 11/10; E05D 11/1007; E05D 11/1014
See application file for complete search history.

(56) References Cited

U.S. PATENT DOCUMENTS 9,097,048 B2 *  8/2015  McCullough .............. E05D 3/04
9,752,364 B2 *  9/2017  James .................. E05D 11/1014
(Continued)

FOREIGN PATENT DOCUMENTS

CN           101097809 A         1/2008
DE    102018111736 A1 *     11/2019
(Continued)

*Primary Examiner* — Atul P. Khare
(74) *Attorney, Agent, or Firm* — Kirton McConkie; Evan R. Witt (57) ABSTRACT

An additive manufacturing method and an object manufactured thereby are disclosed. The object includes a first component and a second component pivotally connected to each other through a rotation shaft. A first engaging element of the first component and a second engaging element of the second component spatially correspond to each other. When the object is manufactured in a manufacturing space, the first component is close to the second component, and the first engaging element and the second engaging element are disengaged with each other. After the object is manufactured, the first component is rotated relative to the second component at an adjustment angle around the rotation shaft. The first engaging element and the second engaging element are engaged with each other and locked, to form a use space of the object larger than the manufacturing space. It is beneficial to achieve the purpose of reducing the required manufacturing space.

12 Claims, 12 Drawing Sheets

(51) Int. Cl.
*B33Y 10/00* (2015.01)
*B22F 10/00* (2021.01)
*B22F 5/10* (2006.01)
*E05D 11/10* (2006.01)
*B33Y 80/00* (2015.01)

(52) U.S. Cl.
CPC .............. *B33Y 10/00* (2014.12); *B33Y 80/00* (2014.12); *E05D 11/1007* (2013.01); *E05D 11/1014* (2013.01)

(56) References Cited

U.S. PATENT DOCUMENTS

| | | | | |
|---|---|---|---|---|
| 10,364,598 B2 * | 7/2019 | Tazbaz | ................ | E05D 11/1064 |
| 10,787,846 B2 * | 9/2020 | Notarnicola | .............. | G01F 1/10 |
| 10,828,914 B1 * | 11/2020 | Chung | ................. | B41J 11/0095 |
| 11,085,214 B2 * | 8/2021 | Lee | ........................... | E05D 5/04 |
| 2019/0292821 A1 * | 9/2019 | Gunner | .................... | E05D 5/12 |

FOREIGN PATENT DOCUMENTS

| | | | | |
|---|---|---|---|---|
| DE | 102020109532 B3 * | 2/2021 | | |
| EP | 3771791 A1 * | 2/2021 | ............. | B33Y 80/00 |
| TW | 201718236 A | 6/2017 | | |

* cited by examiner

S01 Producing an object by an additive manufacturing process, wherein the object comprises at least one first component, at least one second component and at least one rotation shaft, the first component and the second component are pivotally connected to each other through the rotation shaft, and the first component is close to the second component, so that the object is produced by the additive manufacturing process in a manufacturing space, wherein the first component comprises a first engaging element, the second component comprises a second engaging element, and the first engaging element and the second engaging element spatially correspond to each other, wherein when the object is produced by the additive manufacturing process in the manufacturing space, the first engaging element and the second engaging element are disengaged with each other.

S02 Removing the object from the manufacturing space, and rotating the first component at an adjustment angle relative to the second component around the rotation shaft as a rotation center, wherein the first engaging element and the second engaging element are engaged with each other and locked, so as to form a use space of the object, wherein the use space of the object is larger than the manufacturing space.

ADDITIVE MANUFACTURING METHOD AND OBJECT MANUFACTURED THEREBY

FIELD OF THE INVENTION

The present disclosure relates to an additive manufacturing method, and more particularly to an additive manufacturing method for reducing a manufacturing space required therein and an object manufactured thereby.

BACKGROUND OF THE INVENTION

With the development of additive manufacturing technology in recent years, the printing speed has also been greatly improved, so that the additive manufacturing has been utilized in mass production. Comparing to the conventional manufacturing, the restrictions of the additive manufacturing is fewer. While designing a product, the additive manufacturing can be utilized to improve the performance of the product. However, the additive manufacturing technology must be implemented in a chamber with a limited size. If the size of component or assembly is larger than the limited volume of the chamber, the component or assembly must be divided to reduce the size for manufacturing. After the respective manufacturing procedures are completed, the divided component or assembly are combined or assembled in a later processing manner. Moreover, when a large-size component or assembly is manufactured through a one-time manufacturing process in a larger-sized molding chamber, a longer production time is required. It causes a reduction in production capacity.

On the other hand, since the additive manufacturing technology such as the powder bed fusion (PBF) technology has the characteristics of that the object manufactured thereby does not require support structures, it allows various fine components with complex geometries to be produced. However, the additive manufacturing technology still has a limitation of minimum distance. When a large number of components are produced in batches by the additive manufacturing technology, the distances among all components must be greater than the limitation of minimum distance, to maintain the necessary space between the all components. It allows that the heat generated during production process is dissipated. Moreover, it prevents the object from generating a stick between the components during the cooling process and obtaining a defective one. Therefore, in a limited manufacturing space, the additive manufacturing technology still has many restrictions when it is applied to the batch production of various components. The production efficiency cannot be improved effectively.

Therefore, there is a need of providing an additive manufacturing method for reducing a manufacturing space required therein and an object manufactured thereby, to address the above-mentioned issues.

SUMMARY OF THE INVENTION

An object of the present disclosure is to provide an additive manufacturing method for reducing a manufacturing space required therein and an object manufactured thereby. By using the additive manufacturing technology such as the powder bed fusion (PBF) technology to realize the integration manufacturing of movable components, a large-sized object is designed to be foldable for production, the manufacturing space required for additive manufacturing process can be reduced, and the production density is increased. The large-size object manufactured by the additive manufacturing process includes at least one rotation shaft and at least one irreversible engaging structure. In an initial arrangement for manufacturing, the large-sized object is kept in a folded state to meet the restrictions of the additive manufacturing process, and the minimum distance among the components is maintained, so that the purpose of reducing the manufacturing space required is achieved. After production, all components are rotated and unfolded through at least one rotation shaft, and the large-size object is maintained at the maximum size by the irreversible engaging structure. No further assembling process is required. It is beneficial to simplify the assembling process, save the manufacturing costs, and improve the operational performance.

Another object of the present disclosure is to provide an additive manufacturing method for reducing a manufacturing space required therein and an object manufactured thereby. With the design of at least one rotation shaft and at least one irreversible engaging structure, the object manufactured by the additive manufacturing process is capable of changing the production arrangement into the use arrangement. The object remains folded in the production arrangement, and all components of the object are maintained to meet the restriction of the minimum distance. It ensures that none of stick is generated between the components during the cooling process due to the accumulation of the heat generated during production process. The components of the object are unfolded through the at least one rotation shaft after production, and the components are fixed in the use arrangement by the at least one irreversible engaging structure. Thus, the additive manufacturing method achieves the purpose of reducing the manufacturing space required. It is beneficial to simplify the manufacturing process of large-sized object, save the manufacturing costs, and improve the operational performance.

In accordance with an aspect of the present disclosure, there is provided an additive manufacturing method including steps of: (a) producing an object by an additive manufacturing process, wherein the object includes at least one first component, at least one second component and at least one rotation shaft, the first component and the second component are pivotally connected to each other through the rotation shaft, and the first component is close to the second component, so that the object is produced by the additive manufacturing process in a manufacturing space, wherein the first component includes a first engaging element, the second component includes a second engaging element, and the first engaging element and the second engaging element spatially correspond to each other, wherein when the object is produced by the additive manufacturing process in the manufacturing space, the first engaging element and the second engaging element are disengaged with each other; and (b) removing the object from the manufacturing space, and rotating the first component at an adjustment angle relative to the second component around the rotation shaft as a rotation center, wherein the first engaging element and the second engaging element are engaged with each other and locked, so as to form a use space of the object, wherein the use space of the object is larger than the manufacturing space.

In an embodiment, the manufacturing space has a maximum diameter value, the first component has a first maximum length value, the second component has a second maximum length value, and the maximum diameter value is greater than the first maximum length value and the second maximum length value, respectively.

In an embodiment, the adjustment angle is 180°, and the maximum diameter value is less than the sum of the first maximum length value and the second maximum length value.

In an embodiment, the adjustment angle is 90°, and the square of the maximum diameter value is less than the sum of the square of the first maximum length value and the square of the second maximum length value.

In an embodiment, the adjustment angle is ranged from 90° to 270°.

In an embodiment, when the object is produced by the additive manufacturing process in the manufacturing space, the first component and the second component close to each other have a minimum separation distance therebetween.

In an embodiment, the minimum separation distance is ranged from 0.3 mm to 0.5 mm.

In an embodiment, the additive manufacturing process utilized to produce the object in the step (a) is a powder bed fusion technology.

In an embodiment, the first engaging element and the second engaging element are disposed adjacent to the rotation shaft, respectively.

In an embodiment, the first component further includes at least one limiting portion, and when the first component is rotated relative to the second component around the rotation shaft, the limiting portion is engaged with the second component to restrict the first component rotated at the adjustment angle.

In accordance with another aspect of the present disclosure, there is provided an object manufactured by an additive manufacturing method. The object includes at least one first component, at least one second component and at least one rotation shaft. The first component and the second component are pivotally connected to each other through the rotation shaft. The first component includes a first engaging element, the second component includes a second engaging element, and the first engaging element and the second engaging element spatially correspond to each other. When the object is produced by an additive manufacturing process in a manufacturing space and the first component is close to the second component, and the first engaging element and the second engaging element are disengaged with each other. After the object is manufactured by the additive manufacturing process, the first component is rotated at an adjustment angle relative to the second component around the rotation shaft as a rotation center, and the first engaging element and the second engaging element are engaged with each other and locked, so as to form a use space of the object. The use space of the object is larger than the manufacturing space.

In an embodiment, the manufacturing space has a maximum diameter value, the first component has a first maximum length value, the second component has a second maximum length value, and the maximum diameter value is greater than the first maximum length value and the second maximum length value, respectively.

In an embodiment, the adjustment angle is 180°, and the maximum diameter value is less than the sum of the first maximum length value and the second maximum length value.

In an embodiment, the adjustment angle is 90°, and the square of the maximum diameter value is less than the sum of the square of the first maximum length value and the square of the second maximum length value.

In an embodiment, the adjustment angle is ranged from 90° to 270°.

In an embodiment, when the object is produced by the additive manufacturing process in the manufacturing space, the first component and the second component close to each other have a minimum separation distance therebetween.

In an embodiment, the minimum separation distance is ranged from 0.3 mm to 0.5 mm.

In an embodiment, the additive manufacturing process is a powder bed fusion technology.

In an embodiment, the first engaging element and the second engaging element are disposed adjacent to the rotation shaft, respectively.

In an embodiment, the first component further comprises at least one limiting portion, and when the first component is rotated relative to the second component around the rotation shaft, the limiting portion is engaged with the second component to restrict the first component rotated at the adjustment angle.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
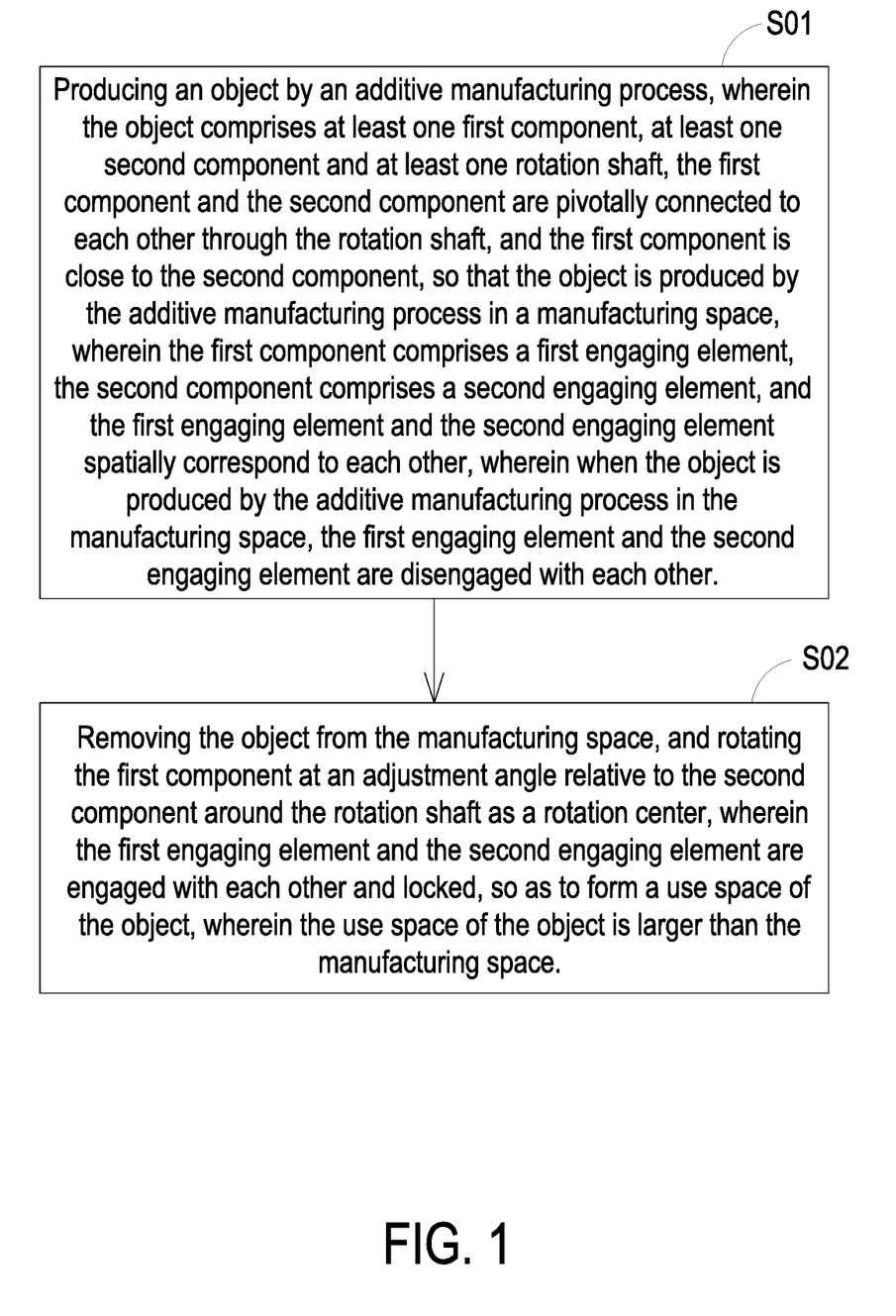
FIG. 1 is a flowchart illustrating an additive manufacturing method for reducing a manufacturing space required according to the embodiment of the present disclosure.
Figure 2:
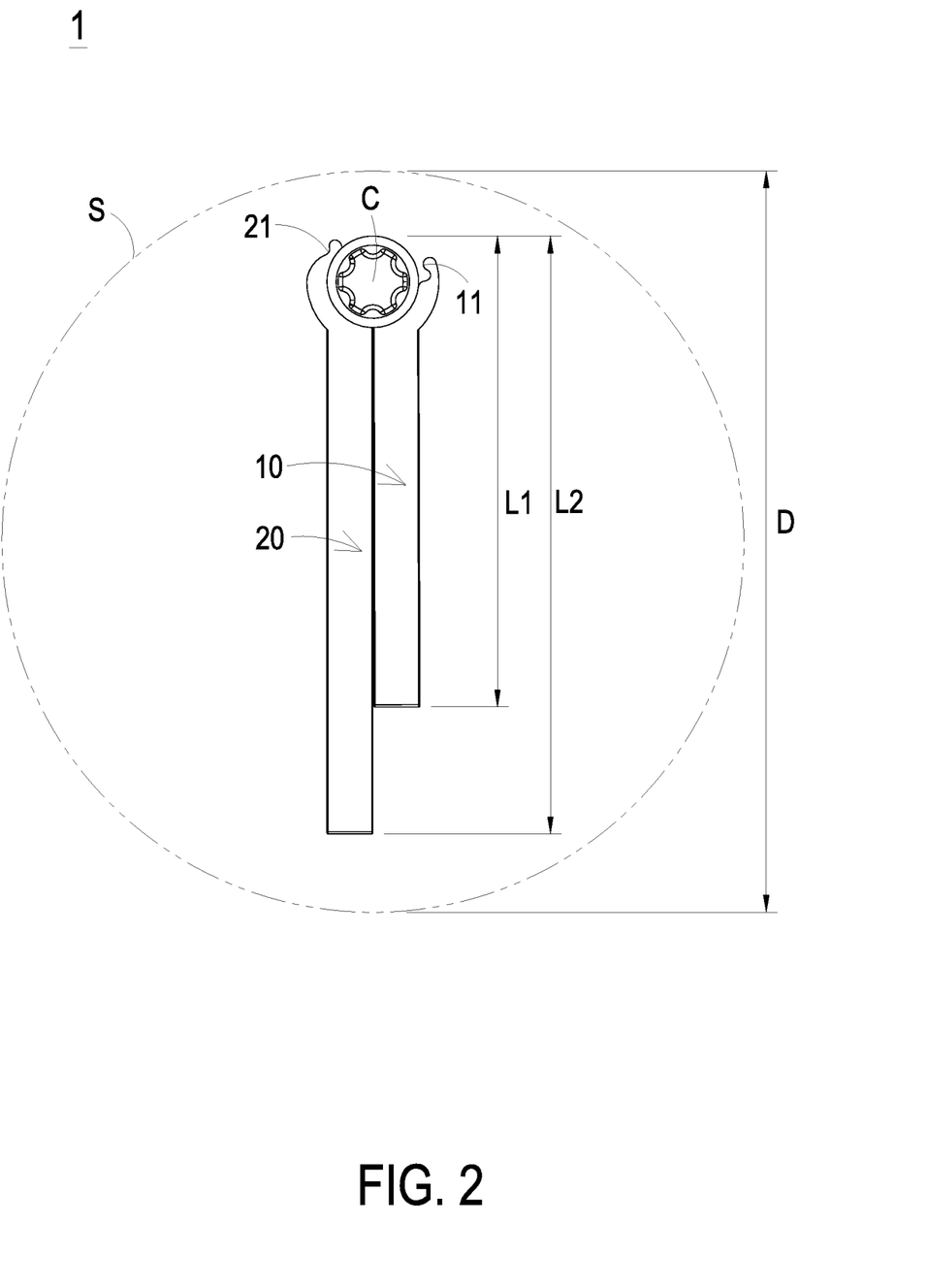
FIG. 2 is a schematic diagram illustrating an object manufactured by the additive manufacturing process in a manufacturing space according to a first embodiment of the present disclosure.
Figure 3:
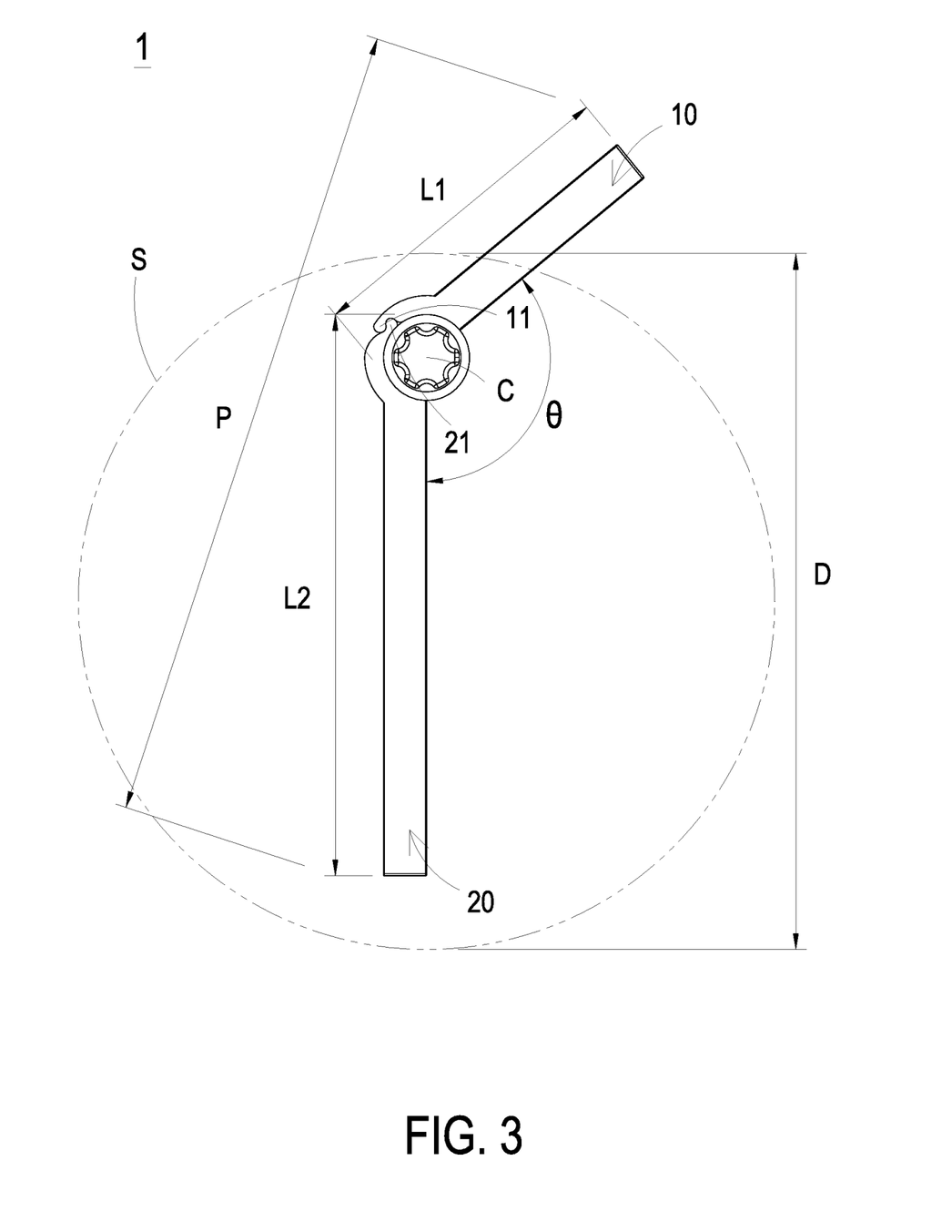
FIG. 3 is a schematic diagram illustrating the object unfolded to form a use space according to the first embodiment of the present disclosure.

FIG. 1 is a flowchart illustrating an additive manufacturing method for reducing a manufacturing space required according to the embodiment of the present disclosure. FIG. 2 is a schematic diagram illustrating an object manufactured by the additive manufacturing process in a manufacturing space according to a first embodiment of the present disclosure. FIG. 3 is a schematic diagram illustrating the object unfolded to form a use space according to the first embodiment of the present disclosure. Firstly, as shown at the step S01, an additive manufacturing process is implemented to produce an object 1. In the embodiment, the object 1 includes at least one first component 10, at least one second component 20 and at least one rotation shaft C. The first component 10 and the second component 20 are pivotally connected to each other through the rotation shaft C, and the first component 10 is close to the second component 20. In that, the object 1 is produced by the additive manufacturing process in a manufacturing space S. In the embodiment, the first component 10 includes at least one first engaging element 11. The second component 20 includes at least one second engaging element 21. The first engaging element 11 and the second engaging element 21 spatially correspond to each other. When the object is produced by the additive manufacturing process in the manufacturing space S, the first engaging element 11 and the second engaging element 21 are disengaged with each other. Preferably but not exclusively, the additive manufacturing process utilized to produce the object 1 in the step S01 is a powder bed fusion technology. Preferably but not exclusively, the rotation shaft C is a shaft body combined with the pivot hole, and the shaft body and the pivot hole are disposed on the first component 10 and the second component 20, respectively. The present disclosure is not limited to the pivoting method, and not redundantly described herein. Notably, when the object 1 is produced by the additive manufacturing process in the manufacturing space S, the first component 10 and the second component 20 close to each other have a minimum separation distance (not shown) therebetween, to meet the restriction of the minimum distance for the additive manufacturing process. It ensures that none of stick is generated among the first component 10, the second component 20 and the rotation shaft C during the cooling process due to the accumulation of the heat generated during production process. Preferably but not exclusively, the minimum separation distance is ranged from 0.3 mm to 0.5 mm, so as to meet the restrictions of the additive manufacturing process. After the additive manufacturing process, as shown in the step S02, the object 1 is removed from the manufacturing space S. The first component 10 is rotated at an adjustment angle θ relative to the second component 20 around the rotation shaft C as a rotation center. At the same time, the first engaging element 11 and the second engaging element 21 are engaged with each other and locked, so as to form a use space (Referring to FIG. 3) of the object 1. In the embodiment, the use space of the object 1 is larger than the manufacturing space S.

Notably, by using the additive manufacturing technology such as the powder bed fusion (PBF) technology mentioned as the above, a large-sized object 1 is designed to be foldable for production, the manufacturing space S required for additive manufacturing process can be reduced, and the production density is increased. With the at least one rotation shaft C and at least one irreversible engaging structure combined by the first engaging element 11 and the second engaging element 21 of the object 1, the object 1 manufactured by the additive manufacturing process is capable of changing the production arrangement (Referring to FIG. 2) into the use arrangement (Referring to FIG. 3). In the production arrangement, the object 1 remains folded in the manufacturing space S, which is less than the use space. At the same time, the rotation shaft C, the first component 10 and the second component 20 are maintained to meet the restriction of the minimum distance to ensure that none of stick is generated between the components during the cooling process due to the accumulation of the heat. On the other hand, the first component 10 and the second component 20 are unfolded through the at least one rotation shaft C after the production process. Moreover, the first component 10 and the second component 20 are fixed in the use arrangement by the first engaging element 11 and the second engaging element 21 engaged with each other. Thus, the additive manufacturing method achieves the purpose of reducing the manufacturing space S required. It is beneficial to simplify the manufacturing process of large-sized object 1, save the manufacturing costs, and improve the operational performance.

In the embodiment, the use space of the object 1 is larger than the manufacturing space S limited by the additive manufacturing process. Preferably but not exclusively, the manufacturing space S has a maximum diameter value D, the first component 10 has a first maximum length value L1, the second component 20 has a second maximum length value L2, and the maximum diameter value D is greater than the first maximum length value L1 and the second maximum length value L2, respectively. It facilitates the object 1 to be accommodated within the manufacturing space S for producing by the additive manufacturing process. After the additive manufacturing process, the object 1 is removed from the manufacturing space S. The first component 10 is rotated at an adjustment angle θ relative to the second component 20 around the rotation shaft C as a rotation center. Moreover, the first engaging element 11 and the second engaging element 21 are engaged with each other and locked, so as to form the use space (Referring to FIG. 3) of the object 1. For the conventional additive manufacturing method, the use space of the object 1 is regarded as an original manufacturing space. However, by using the additive manufacturing method of the present disclosure, the original manufacturing space (i.e. the use space) is reduced to meet the limitation of the manufacturing space S. Referring to FIGS. 2 and 3, preferably but not exclusively, in the embodiment, the adjustment angle θ of the first component 10 rotated relative to the second component 20 is ranged from 90° to 270°. If the use space of the object 1 is represented by a maximum feature length value P, the maximum feature length value P can be expressed by the following equation (1):

$$P^2 = L1^2 + L2^2 - 2 \times L1 \times L2 \times \cos \theta \quad (1)$$

In the embodiment, the first component 10 and the second component 20 of the object 1 are folded to reduce the volume through the rotation shaft axis C during the additive manufacturing process, so that the folded object 1 can be accommodated within the manufacturing space S having the maximum diameter value D. The purpose of reducing original manufacturing space is achieved. In other words, although the manufacturing space S is limited, the object 1 manufactured by the additive manufacturing process and unfolded to have the maximum feature length value P is obtained. For example, the adjustment angle is 180°, and the maximum diameter value D is less than the sum of the first maximum length value L1 of the first component 10 and the second maximum length value L2 of the second component 20. The object 1 unfolded to form the use space cannot be accommodated within the manufacturing space S to produce the additive manufacturing process. In the embodiment, the first component 10 and the second component 20 are folded through the rotation shaft C, as shown in FIG. 2, and the object 1 folded is accommodated within the manufacturing space S to produce the additive manufacturing process. For example, the adjustment angle is 90°, and the square of the maximum diameter value D is less than the sum of the square of the first maximum length value L1 of the first component 10 and square of the second maximum length value L2 of the second component 20. The object 1 unfolded to form the use space cannot be accommodated within the manufacturing space S to produce the additive manufacturing process. In the embodiment, the first component 10 and the second component 20 are folded through the rotation shaft C, as shown in FIG. 2, and the object 1 folded is accommodated within the manufacturing space S to produce the additive manufacturing process. In other words, by designing the large-sized object 1 to be foldable for production, it facilitates the additive manufacturing method to achieve the purposes of reducing the original manufacturing space and increasing the production density. In order to produce the large-sized object 1 by the additive manufacturing process, an initial arrangement of the large-sized object 1 is kept in a folded statue to meet the restrictions of the additive manufacturing process, and the minimum distance among the components is maintained. Thus, the purpose of reducing the original manufacturing space is achieved. After production, the first component 10 and the second component 20 are unfolded through at least one rotation shaft C, and the large-size object 1 is maintained at the maximum size by the first engaging element 11 and the second engaging element 21 engaged with each other. No further assembling process is required. It is beneficial to simplify the assembling process, save the manufacturing costs, and improve the operational performance. Notably, the adjustment angle θ of the first component 10 rotated relative to the second component 20 is configured to fold the object 1, so as to meet the restrictions of the additive manufacturing process. Certainly, the adjustment angle θ is adjustable according to the practical requirements, and the present disclosure is not limited thereto.

Figure 4:
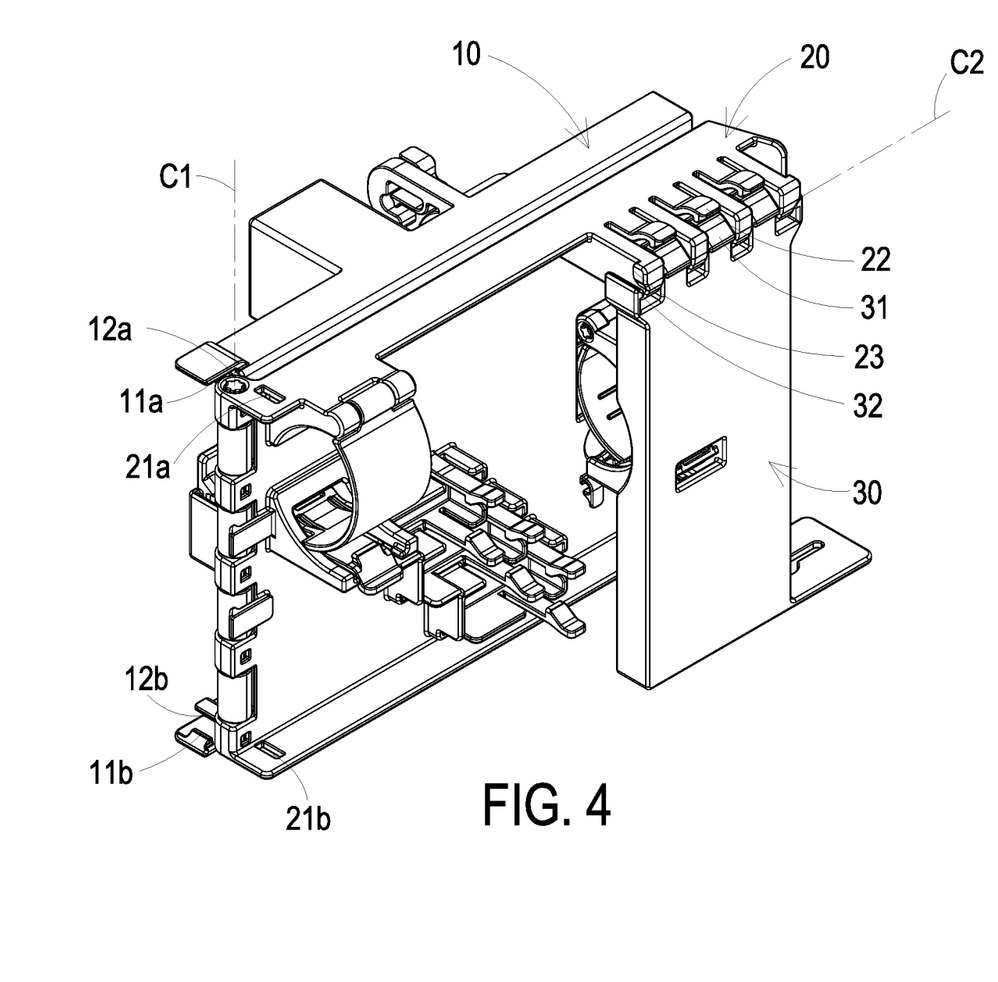
FIG. 4 is a schematic structural view illustrating an object manufactured by the additive manufacturing process in a manufacturing space according to a second embodiment of the present disclosure.
Figure 5:
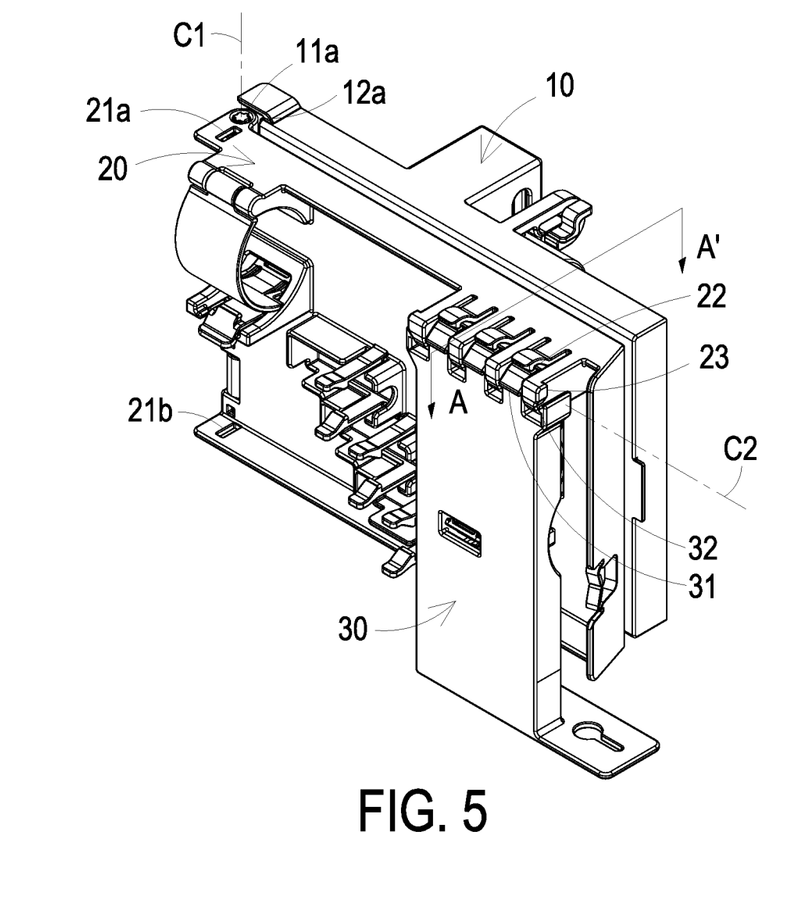
FIG. 5 is a schematic structural view illustrating the object manufactured by the additive manufacturing process in the manufacturing space according to the second embodiment of the present disclosure and taken from a different perspective.
Figure 6:
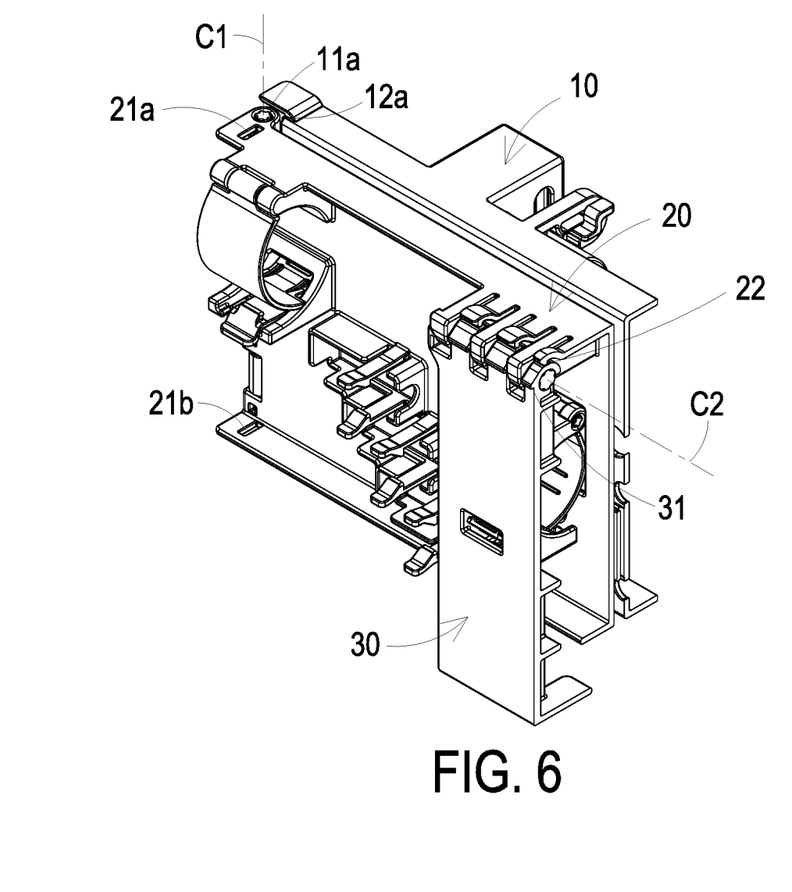
FIG. 6 is a sectional structural view taken along line AA' in FIG. 5.
Figure 7:
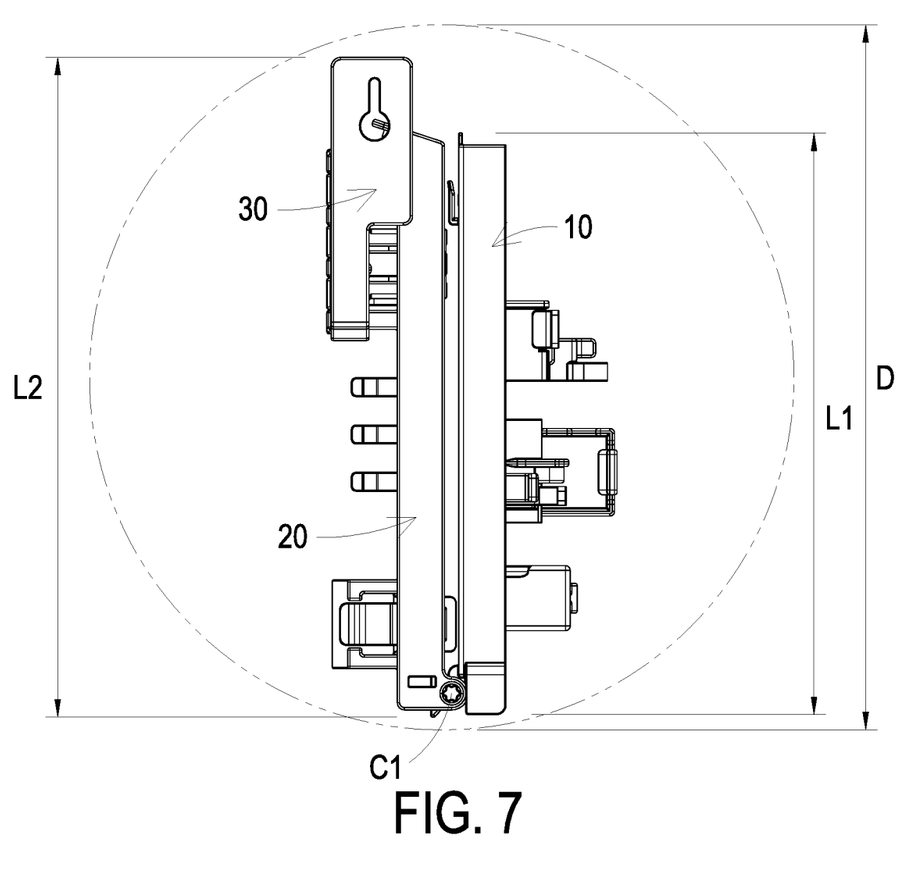
FIG. 7 is a schematic diagram illustrating the object manufactured by the additive manufacturing process in the manufacturing space according to the second embodiment of the present disclosure.
Figure 8:
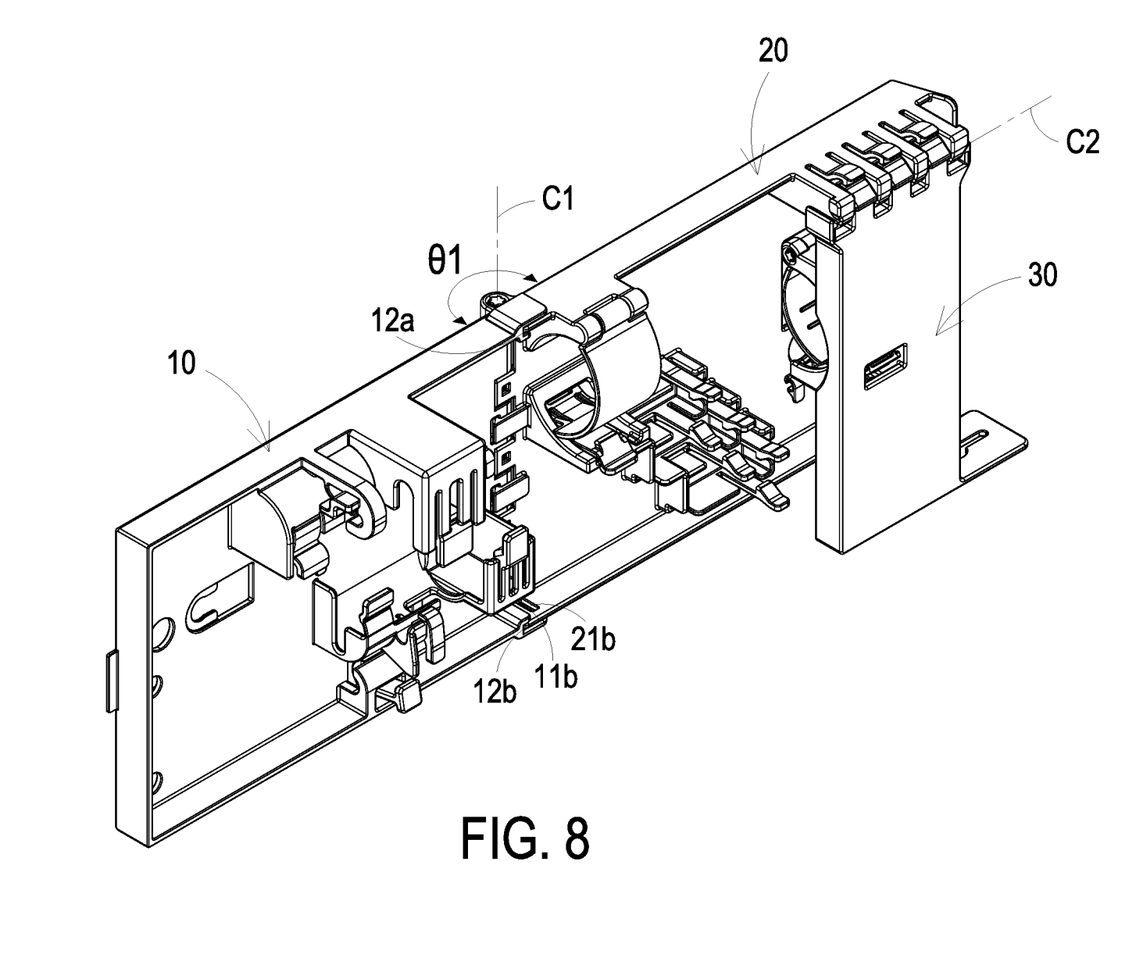
FIG. 8 is a schematic structural view illustrating the object having the first component unfolded relative to the second component according to the second embodiment of the present disclosure.
Figure 9:
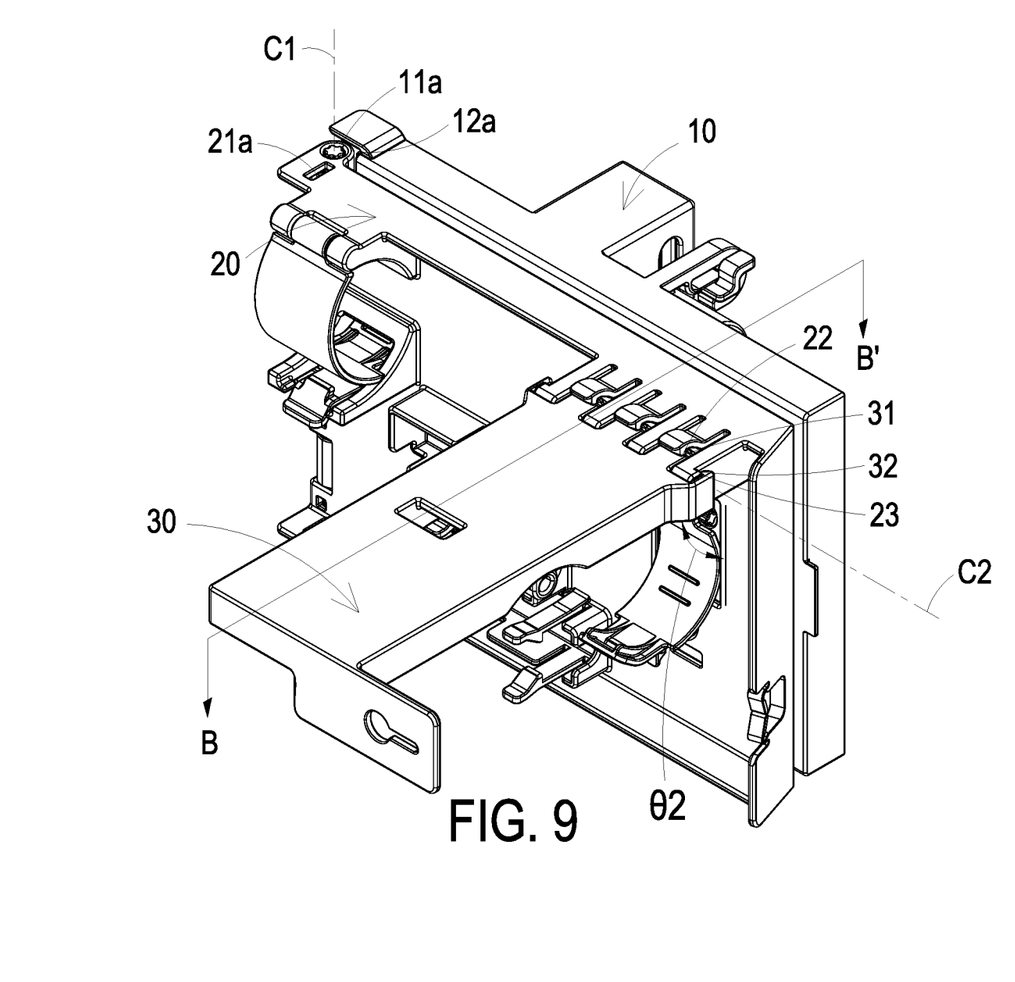
FIG. 9 is a schematic structural view illustrating the object having the third component unfolded relative to the second component according to the second embodiment of the present disclosure.
Figure 10:
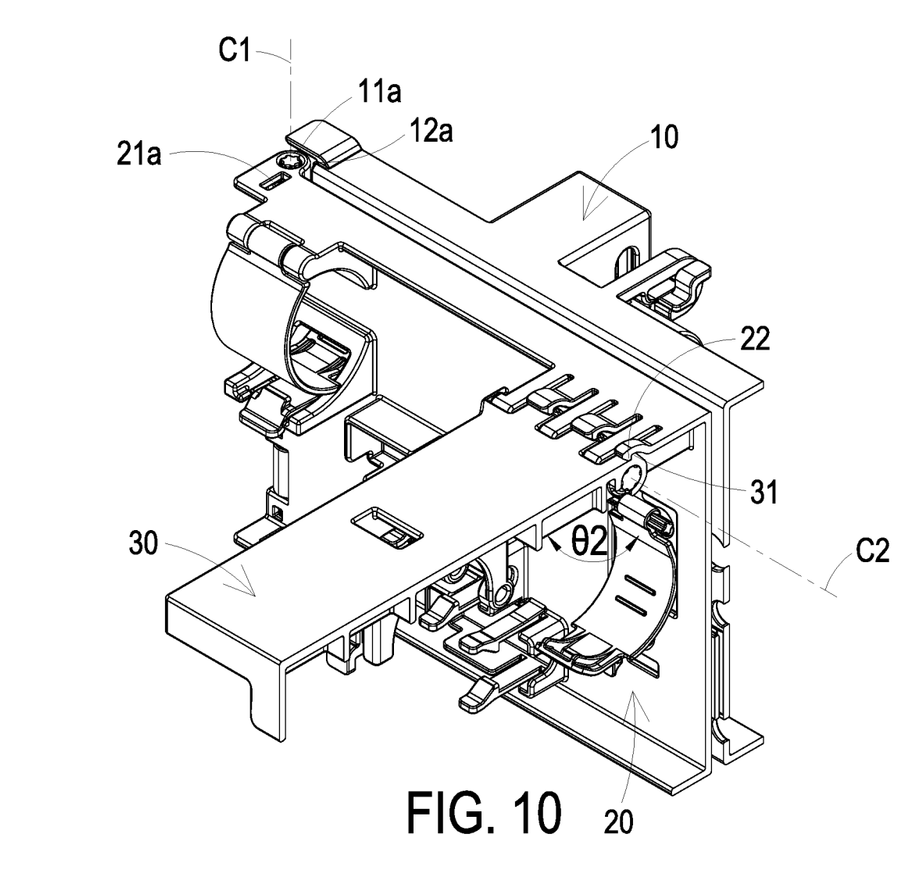
FIG. 10 is a sectional structural view taken along line BB' in FIG. 9.
Figure 11:
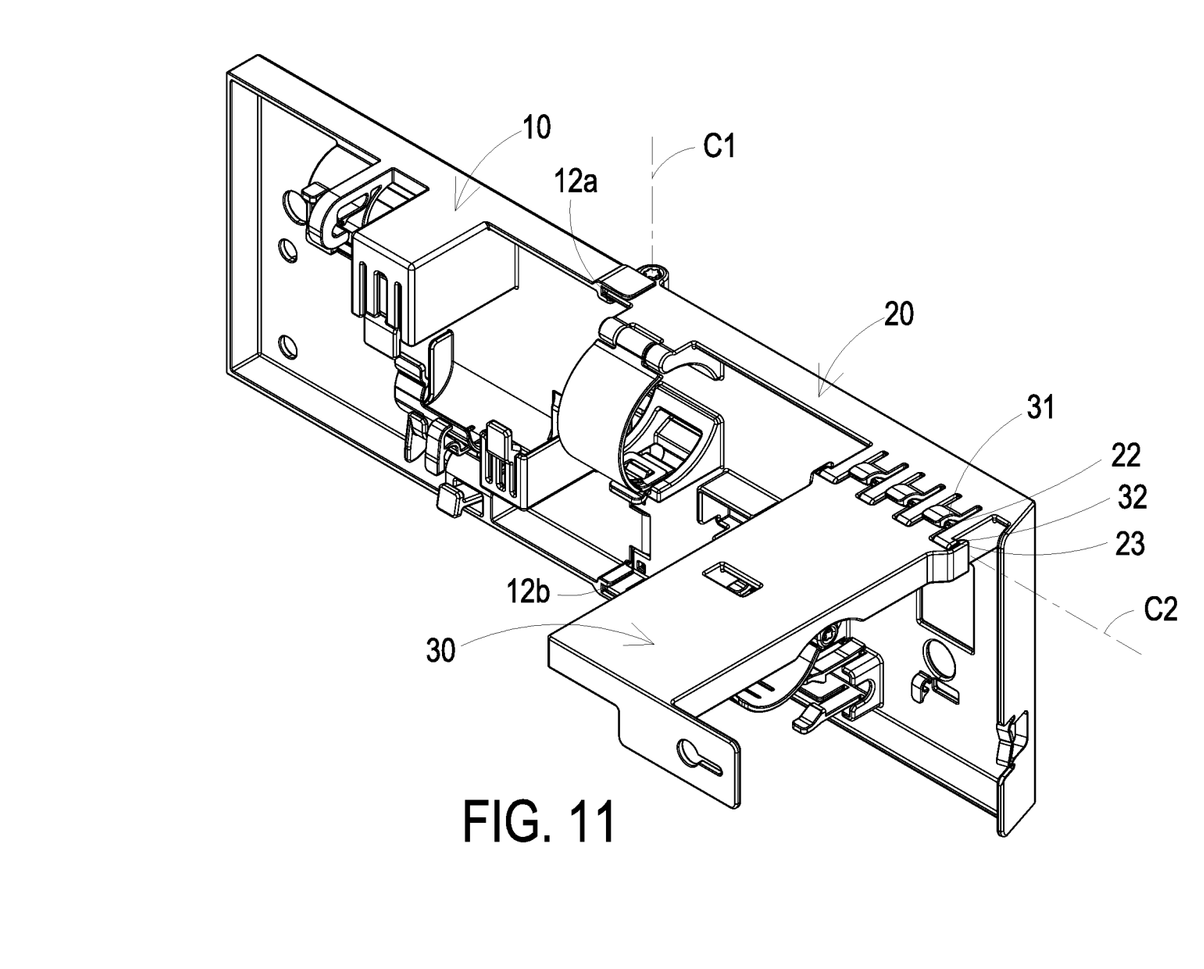
FIG. 11 is a schematic structural view illustrating the object unfolded to form a use space according to the second embodiment of the present disclosure.
Figure 12:
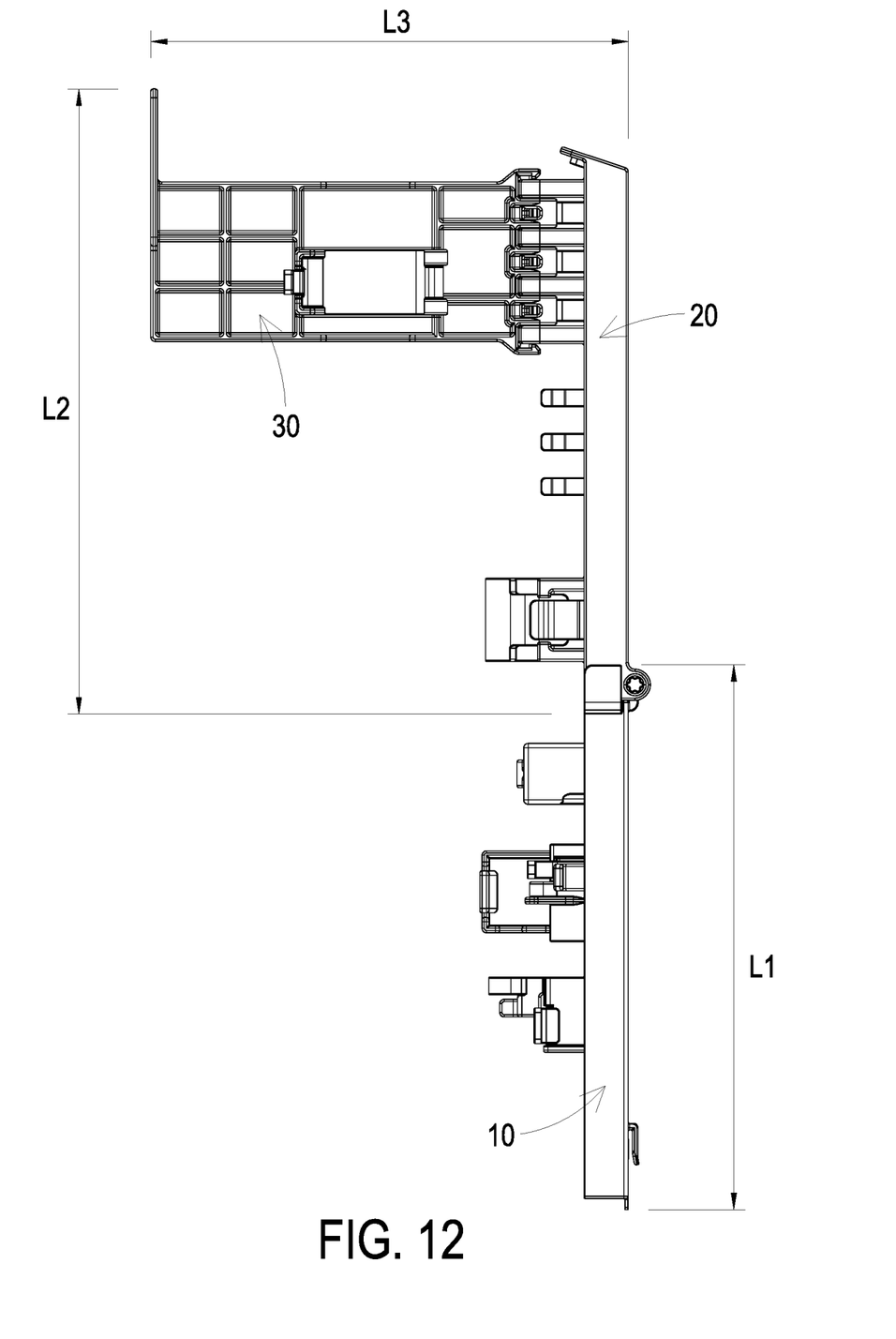
FIG. 12 is a schematic diagram illustrating the object unfolded to form the use space according to the second embodiment of the present disclosure.

FIGS. 4 and 5 are schematic structural views illustrating an object manufactured by the additive manufacturing process in a manufacturing space according to a second embodiment of the present disclosure. FIG. 6 is a sectional structural view taken along line AA' in FIG. 5. FIG. 7 is a schematic diagram illustrating the object manufactured by the additive manufacturing process in the manufacturing space according to the second embodiment of the present disclosure. FIG. 8 is a schematic structural view illustrating the object having the first component unfolded relative to the second component according to the second embodiment of the present disclosure. FIG. 9 is a schematic structural view illustrating the object having the third component unfolded relative to the second component according to the second embodiment of the present disclosure. FIG. 10 is a sectional structural view taken along line BB' in FIG. 9. FIG. 11 is a schematic structural view illustrating the object unfolded to form a use space according to the second embodiment of the present disclosure. FIG. 12 is a schematic diagram illustrating the object unfolded to form the use space according to the second embodiment of the present disclosure. In the embodiment, the structures, elements and functions of the object 1a are similar to those of the object 1 in FIGS. 2 and 3. The elements and features indicated by the numerals similar to those of the first embodiment mean similar elements and features, and are not redundantly described herein. In the embodiment, the object 1a is produced by the additive manufacturing method similarly illustrated in FIG. 1. The object 1a includes a first component 10, a second component 20, a first rotation shaft C1, a third component 30 and a second rotation shaft C2. The first component 10 and the second component 20 are pivotally connected to each other through the first rotation shaft C1, and the first component 10 is close to the second component 20. The third component 30 and the second component 20 are pivotally connected to each other through the second rotation shaft C1, and the third component 30 is close to the second component 20. In that, the object 1a can be accommodated within the manufacturing space S (Referring to FIG. 7) and produced by the additive manufacturing process. In the embodiment, the first component 10 includes a pair of first engaging elements 11a, 11b. The second component 20 includes a pair of second engaging elements 21a, 21b, and a fourth engaging element 22. The third component 30 includes a third engaging element 31. The first engaging elements 11a, 11b spatially correspond to the second engaging elements 21a, 21b. The third engaging element 31 and the fourth engaging element spatially correspond to each other. When the object 1a is produced by the additive manufacturing process in the manufacturing space S, the first engaging elements 11a, 11b and the corresponding second engaging elements 21a, 21b are disengaged with each other, and the third engaging element 31 and the fourth engaging element 22 are disengaged with each other. After the additive manufacturing process, the object 1a is removed from the manufacturing space S. The first component 10 is rotated at a first adjustment angle θ1 relative to the second component 20 around the first rotation shaft C1 as a rotation center. The first engaging elements 11a, 11b and the corresponding second engaging elements 21a, 21b are engaged with each other and locked. Moreover, the third component 30 is rotated at a second adjustment angle θ2 relative to the second component 20 around the second rotation shaft C2 as a rotation center. The third engaging element 31 and the fourth engaging element 22 are engaged with each other and locked. Consequently, a use space (Referring to FIGS. 11 and 12) of the object 1 is formed. In the embodiment, the use space of the object 1a is larger than the manufacturing space S (Referring to FIG. 7).

In the embodiment, the first component 10 has a first maximum length value L1, the second component 20 has a second maximum length value L2, and the third component 30 has a third maximum length value L3. In the embodiment, the large-sized object 1a is designed to be foldable, so as to be produced by the additive process in the manufacturing space S. Preferably but not exclusively, the manufacturing space S has a maximum diameter value D, which is greater than each of the first maximum length value L1, the second maximum length value L2 and the third maximum length value L3. When the object 1a is produced by the additive process, the first component 10 and the second component 20 are folded previously through the first rotation shaft C1, and the third component 30 and the second component 20 are folded previously through the second rotation shaft C2. Thus, the object 1a manufactured by the additive manufacturing process is capable of changing the production arrangement (Referring to FIG. 7) into the use arrangement (Referring to FIG. 12). In the production arrangement, the object 1a remains folded in the manufacturing space S, which is less than the use space. At the same time, the first rotation shaft C1, the first component 10, the second component 20, the second rotation shaft C2 and the third component 30 are maintained to meet the restriction of the minimum distance to ensure that none of stick is generated between the components during the cooling process due to the accumulation of the heat. In the embodiment, the first component 10 includes the first engaging elements 11a, 11b and the second component 20 includes the second engaging elements 21a, 21b. The first engaging elements 11a, 11b and the second engaging elements 21a, 21b spatially correspond to each other. Furthermore, the third component 30 includes the third engaging element 31, and the second component 20 further includes the fourth engaging element 22. The third engaging element 31 and the fourth engaging element 22 spatially correspond to each other. When the object 1a is produced by the additive manufacturing process in the manufacturing space S, the first engaging elements 11a, 11b and the corresponding second engaging elements 21a, 21b are disengaged with each other, and the third engaging element 31 and the fourth engaging element 22 are disengaged with each other. On the other hand, the first component 10 and the second component 20 of the object 1a are unfolded and rotated around the first rotation shaft C1 at the first adjustment angle θ1 relative to each other after the production process. The first engaging elements 11a, 11b and the corresponding second engaging elements 21a, 21b are engaged with each other and locked, so that the first component 10 and the second component 20 are fixed in the use arrangement. Furthermore, the third component 30 and the second component 20 of the object 1a are unfolded and rotated around the second rotation shaft C2 at the second adjustment angle θ2 relative to each other after the production process. The third engaging element 31 and the fourth engaging element 22 are engaged with each other and locked, so that the third component 30 and the second component 20 are fixed in the use arrangement. Thus, the additive manufacturing method achieves the purpose of reducing the manufacturing space S required. It is beneficial to simplify the manufacturing process of large-sized object 1a, save the manufacturing costs, and improve the operational performance.

In the embodiment, the first engaging elements 11a, 11b of the first component 10 and the corresponding second engaging elements 21a, 21b can be for example but not limited to a convex portion and a concave portion cooperated with each other. Preferably but not exclusively, the first engaging elements 11a, 11b of the first component 10 and the corresponding second engaging elements 21a, 22b of the second component 20 are disposed adjacent to the two opposite ends of the first rotation shaft C1. After the first component 10 is rotated around the first rotation shaft C1 at the first adjustment angle θ1 relative to the second component 20, it is advantage of that the first component 10 and the second component 20 are fixed in the use arrangement firmly and irreversibly. In the embodiment, the third engaging element 31 of the third component 30 and the fourth engaging element 22 can be for example but not limited to a pair of engaging hooks cooperated with each other. Preferably but not exclusively, the third engaging element 31 of the third component 30 and the fourth engaging element 22 of the second component 20 are disposed adjacent to the peripheral edge of the second rotation shaft C2. After the third component 30 is rotated around the second rotation shaft C2 at the second adjustment angle θ2 relative to the second component 20, it is advantage of that the third component 30 and the second component 20 are fixed in the use arrangement firmly and irreversibly. In addition, the third component 30 further includes a fifth engaging element 32, and the second component 20 further includes a sixth engaging element 23. The fifth engaging element 32 and the sixth engaging element 23 spatially correspond to each other. When the object 1a is produced by the additive manufacturing process in the manufacturing space S, the fifth engaging element 32 and the sixth engaging element 23 are disengaged with each other. Preferably but not exclusively, the fifth engaging element 32 and the sixth engaging element 23 are a pair of engaging hooks cooperated with each other, and disposed adjacent to the two opposite ends of the second rotation shaft C2. After the production process, the third component 30 is rotated around the second rotation shaft C2 at the second adjustment angle θ2 relative to the second component 20, the third engaging element 31 and the fourth engaging element 22 are engaged with each other, and the fifth engaging element 32 and the sixth engaging element 23 are engaged with each other. In that, the third component 30 and the second component 20 are fixed in the use arrangement firmly and irreversibly. Moreover, the structural strength of the object 1a in the use arrangement is enhanced. Preferably but not exclusively, in the embodiment, the first adjustment angle θ1 and the second adjustment angle θ2 are 180° and 90°, respectively. In the embodiment, the first component 10 further includes a pair of limiting portions 12a, 12b disposed adjacent to the two opposite ends of the first rotation shaft C1. When the first component 10 is rotated relative to the second component 20 around the first rotation shaft C1, the limiting portions 12a, 12b are engaged with the second component 20, so as to restrict the first component 10 rotated at the first adjustment angle θ1. Certainly, the present disclosure is not limited thereto and not redundantly described herein.

It should be emphasized that the numbers of the rotation shafts C, C1 and C2 and the engaging elements 11, 11a, 11b, 21, 21a, 21b, 22, 23, 31 and 32 in the objects 1 and 1a, manufactured by the additive manufacturing method of the present disclosure are adjustable according to the practical requirements. It facilitates the objects 1 and 1a to meet restrictions of the additive manufacturing process. After the additive manufacturing process, the components 10, 20 and 30 of the objects 1 and 1a are unfolded at the adjustment angles θ, θ1, θ2, and the use space is formed irreversibly and is directly used. The integration design is achieved efficiently.

In summary, the present disclosure provides an additive manufacturing method for reducing a manufacturing space required therein and an object manufactured thereby. By using the additive manufacturing technology such as the powder bed fusion (PBF) technology to realize the integration manufacturing of movable components, a large-sized object is designed to be foldable for production, the manufacturing space required for additive manufacturing process can be reduced, and the production density is increased. The large-size object manufactured by the additive manufacturing process includes at least one rotation shaft and at least one irreversible engaging structure. In an initial arrangement for manufacturing, the large-sized object is kept in a folded state to meet the restrictions of the additive manufacturing process, and the minimum distance among the components is maintained, so that the purpose of reducing the manufacturing space required is achieved. After production, all components are rotated and unfolded through at least one rotation shaft, and the large-size object is maintained at the maximum size by the irreversible engaging structure. No further assembling process is required. It is beneficial to simplify the assembling process, save the manufacturing costs, and improve the operational performance. In addition, with the design of at least one rotation shaft and at least one irreversible engaging structure, the object manufactured by the additive manufacturing process is capable of changing the production arrangement into the use arrangement. The object remains folded in the production arrangement, and all components of the object are maintained to meet the restriction of the minimum distance. It ensures that none of stick is generated between the components during the cooling process due to the accumulation of the heat generated during production process. The components of the object are unfolded through the at least one rotation shaft after production, and the components are fixed in the use arrangement by the at least one irreversible engaging structure. Thus, the additive manufacturing method achieves the purpose of reducing the manufacturing space required. It is beneficial to simplify the manufacturing process of large-sized object, save the manufacturing costs, and improve the operational performance.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method comprising steps of:
   (a) producing an object in a manufacturing space by an additive manufacturing process, wherein the object comprises a first component, a second component, and a rotation shaft, the first component and the second component being pivotally connected to each other through the rotation shaft and the first component being folded close to the second component during said producing by the additive manufacturing process, wherein the first component comprises first engaging elements spaced along the rotation shaft, the second component comprises second engaging elements spaced along the rotation shaft, and the first engaging elements and the second engaging elements spatially correspond to each other respectively, wherein when the object is produced by the additive manufacturing process in the manufacturing space, the first engaging elements and the second engaging elements are disengaged from each other; and
   (b) removing the object from the manufacturing space, and rotating and unfolding the first component to an adjustment angle relative to the second component around the rotation shaft as a rotation center such that the first engaging elements and the second engaging elements are firmly and irreversibly engaged with each other and locked respectively, thereby forming a use space of the object, wherein the use space of the object is larger than the manufacturing space.

2. The method according to claim 1, wherein the manufacturing space has a maximum diameter value, the first component has a first maximum length value, the second component has a second maximum length value, and the maximum diameter value is greater than the first maximum length value and the second maximum length value, respectively.

3. The method according to claim 2, wherein the adjustment angle is 180°, and the maximum diameter value is less than the sum of the first maximum length value and the second maximum length value.

4. The method according to claim 2, wherein the adjustment angle is 90°, and the square of the maximum diameter value is less than the sum of the square of the first maximum length value and the square of the second maximum length value.

5. The method according to claim 1, wherein the adjustment angle is ranged from 90° to 270°.

6. The method according to claim 1, wherein when the object is produced by the additive manufacturing process in the manufacturing space, the first component and the second component folded close to each other have a minimum separation distance therebetween.

7. The method according to claim 6, wherein the minimum separation distance is ranged from 0.3 mm to 0.5 mm.

8. The method according to claim 1, wherein the additive manufacturing process utilized to produce the object in the step (a) is a powder bed fusion technology.

9. The method according to claim 1, wherein the first engaging element and the second engaging element are disposed adjacent to the rotation shaft, respectively.

10. The method according to claim 1, wherein the first component further comprises at least one limiting portion, and when the first component is rotated relative to the second component around the rotation shaft, the limiting portion is engaged with the second component to restrict the first component rotated at the adjustment angle.

11. The method according to claim 1, wherein the object further comprises a third component comprising a third engaging element and a fourth component comprising a fourth engaging element, the third engaging element and the fourth engaging element spatially corresponding to one another, wherein when the object is produced in the additive manufacturing process in the manufacturing space, the third component is folded close to the fourth component such that the third engaging element and the fourth engaging element are disengaged from each other, and wherein the method further comprises, after said removing from the manufacturing space, a step of rotating and unfolding the third component to an adjustment angle relative to the fourth component such that the third engaging element and the fourth engaging element are firmly and irreversibly engaged with each other and locked.

12. The method according to claim 1, wherein the first component comprises a third engaging element and the second component comprises a fourth engaging element, the third engaging element and the fourth engaging element spatially corresponding to one another, wherein when the object is produced by the additive manufacturing process in the manufacturing space, the third engaging element and the fourth engaging element are disengaged from each other, and wherein said rotating and unfolding causes the third engaging element and the fourth engaging element to become firmly and irreversibly engaged with each other and locked.

* * * * *